H. HUNT.
METHOD OF CLOSING AIR TIGHT EXHAUSTED CANNISTERS, &C.

No. 9,989.  Patented Sept. 6, 1853.

UNITED STATES PATENT OFFICE.

HENRY HUNT, OF BROOKLYN, NEW YORK.

IMPROVEMENT IN SEALING PRESERVE-CANISTERS.

Specification forming part of Letters Patent No. 9,989, dated September 6, 1853.

*To all whom it may concern:*

Be it known that I, HENRY HUNT, of Brooklyn, Kings county, New York, have invented an Improvement in Method of Closing Air-Tight Exhausted Canisters and other Vessels, Chiefly Intended for Preserving Provisions, of which the following is a full, clear, and exact description, reference being had to the accompanying drawings, making part of this specification, in which—

Figure 1:
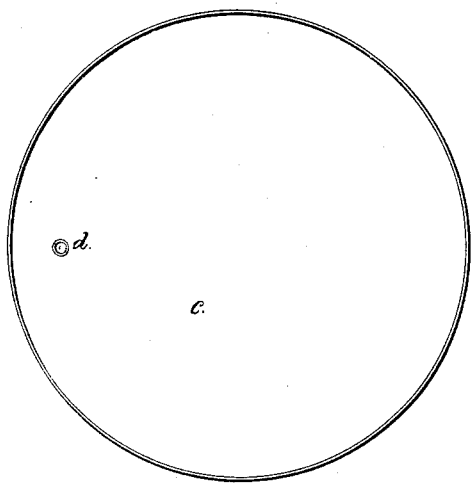
Figure 3:
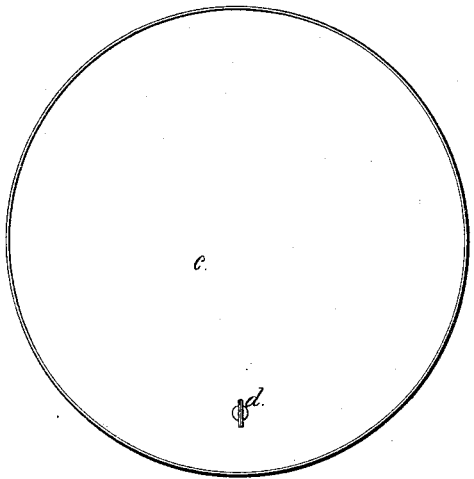
Figure 2:
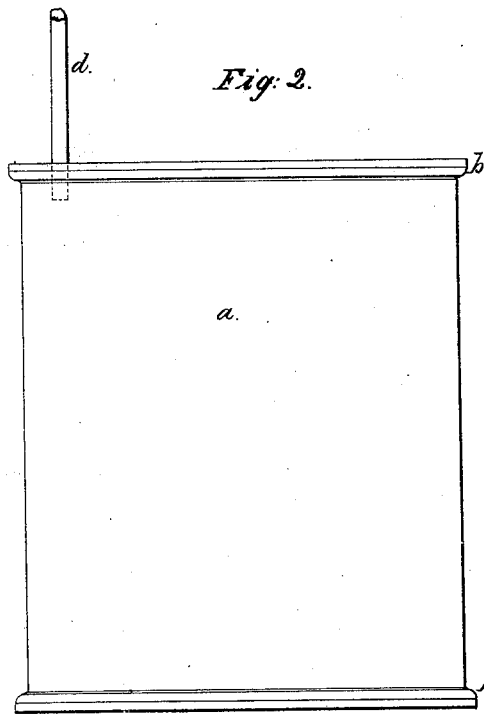

Figure 1 is a plan of a tin canister closed on my improved plan; Fig. 2, an elevation; Fig. 3, a plan, and Fig. 4 a vertical section, of the same in course of construction.

Much difficulty has heretofore been experienced in closing vessels from which atmospheric air has been exhausted, for the purpose of preserving provisions and other articles from contact with atmospheric air, and, although various plans have been essayed, none, to my knowledge, have been practically useful, and in consequence the mode of expelling the air by heat during the operation of soldering on the cover is generally employed; but as this method cannot be employed in putting up articles that are injured by heat, the invention of a cheap and practicable plan for doing this without heat has continued to be a desideratum.

The nature of my invention for the accomplishment of this result consists in excluding air from articles put up in canisters or other vessels by providing the vessel with a small tube attached thereto, and connecting the said tube with the receiver of an air-pump, and after the air has been exhausted mashing or pressing together the said tube to make an air-tight joint until it can be separated from the exhausting apparatus and cut off and soldered, or otherwise made permanently air-tight.

Figure 4:
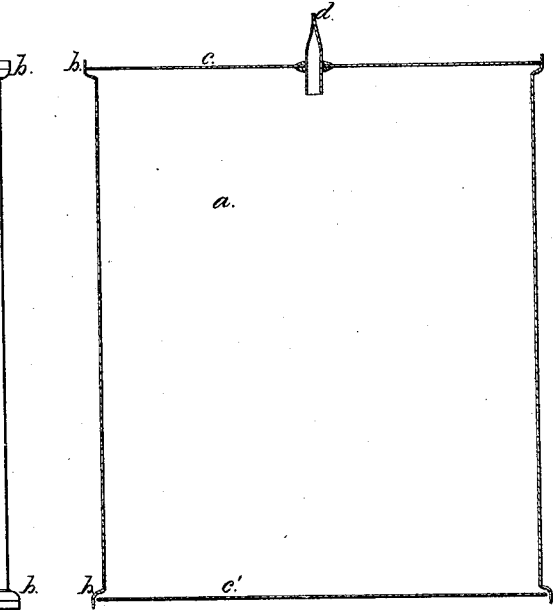

In the accompanying drawings, $a$ represents a cylinder, of tin, to form the canister. The edges $b\ b$ are forced out by suitable machinery known to tinmen, in the form of curved flanges, to receive the heads $c\ c'$, which are disks of tin, and when these are laid in they can be soldered with facility, the angle formed by the flange and the head being well adapted to receive the solder to insure air-tight joints. One of the heads is provided with a small short tube, $d$, properly secured to the head, so as to be air-tight. This tube can be made of any pliable metal, although I prefer block-tin or lead, and it may be either cylindrical or flat or other shape, and may be very small. The canisters are made with one head soldered on, and after the articles to be preserved are put in the other head can be soldered on; or, if the thing to be preserved be a liquid—such as milk—it may be introduced through the pipe, if desired; but however introduced, after the canister has been filled and the head soldered on, the pipe $d$ is to be connected, in any suitable manner, with the receiver of an air-pump or other exhausting apparatus and the air thoroughly exhausted from the canister, and then the pipe $d$ is to be forced or mashed together, as shown in Figs. 3 and 4, by means of pincers $_o$or other suitable instrument to make an air-tight joint. The upper end of the tube can then be cut off where pressed together and soldered to insure the joints remaining air-tight. In this way the canister is sealed hermetically while under the action of the air-pump or exhausting apparatus, to insure a vacuum which is maintained with certainty by means more simple and cheap than any other heretofore known, and more sure, for stop-cocks are too expensive and liable to leak, while this is cheap and can be made air-tight in the readiest manner and without the necessity of mechanical skill.

Although I have described the manner of constructing and putting together the tin canister and the metallic tube or its equivalent, I do not wish to limit myself thereto, as my invention is applicable to vessels made in any manner and of any material which will admit of the attachment of a tube, which can be connected with an air-pump or other exhausting apparatus, and which can be squeezed or pressed together to make an air-tight joint until it can be soldered or otherwise permanently cemented.

What I claim as my invention, and desire to secure by Letters Patent, is—

Excluding air from articles put up in closed canisters or other vessels by providing the canister or other vessel with a metallic tube or its equivalent attached thereto, and after the air has been exhausted through the said tube pressing it together air-tight, that it may be soldered or cemented to render the joint permanently air-tight, substantially as described.

Witnesses:          HENRY HUNT.
  CHAS. W. BARNBURGH,
  WM. H. BISHOP.